I. E. HENRY.
SPEED REGULATOR FOR AUTOMOBILES.
APPLICATION FILED FEB. 21, 1917.

1,239,391.

Patented Sept. 4, 1917.
2 SHEETS—SHEET 1.

INVENTOR
Irwin E. Henry,
BY Victor J. Evans
ATTORNEY

WITNESSES

I. E. HENRY.
SPEED REGULATOR FOR AUTOMOBILES.
APPLICATION FILED FEB. 21, 1917.
1,239,391.
Patented Sept. 4, 1917.
2 SHEETS—SHEET 2.
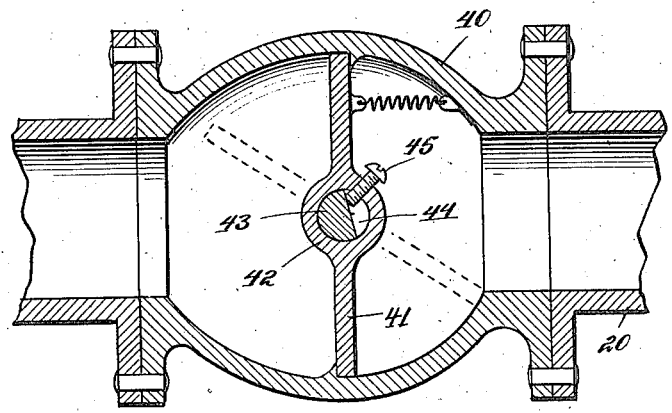
Fig. 3
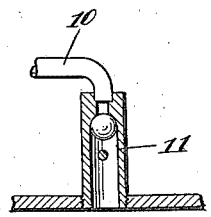
Fig. 4
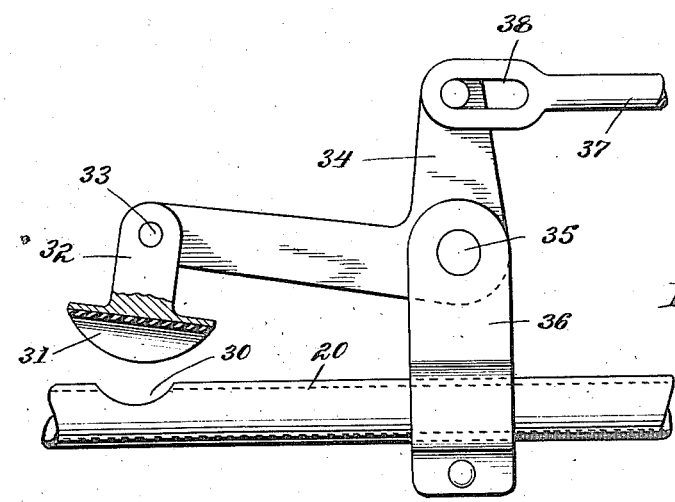
Fig. 2
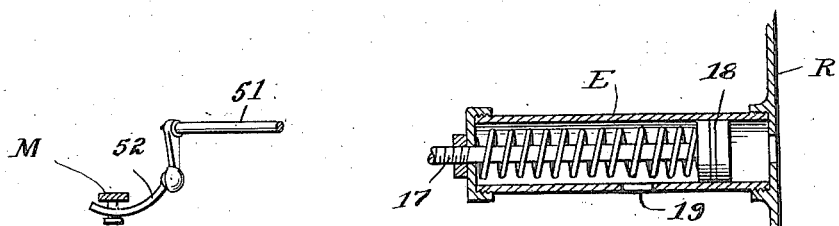
Fig. 6
Fig. 5
INVENTOR
Irwin E. Henry,
BY Victor J. Evans
ATTORNEY
WITNESSES

UNITED STATES PATENT OFFICE.

IRWIN E. HENRY, OF NEW RINGGOLD, PENNSYLVANIA.

SPEED-REGULATOR FOR AUTOMOBILES.

1,239,391.   Specification of Letters Patent.   Patented Sept. 4, 1917.

Application filed February 21, 1917. Serial No. 150,121.

*To all whom it may concern:*

Be it known that I, IRWIN E. HENRY, a citizen of the United States, residing at New Ringgold, in the county of Schuylkill and State of Pennsylvania, have invented new and useful Improvements in Speed-Regulators for Automobiles, of which the following is a specification.

This invention relates to speed regulators for automobiles, and more especially to those which include a centrifugal governor for regulating the supply of gas to the engine; and the object of the invention is to combine with such a regulator for the speed of the engine, means for automatically applying the brakes by an air-brake mechanism in case the retarding or checking of the speed of the engine does not sufficiently reduce the speed of progress of the automobile or motor vehicle. A further object is to provide means whereby these two mechanisms may be controlled manually, or rather by treadles or pedals within reach of the operator. Other objects will appear in the following specification, reference being had to the drawings wherein:—

Figs. 2, 3 and 4 are details of valves described hereinafter,

Fig. 5 is a detail of the safety valve, and

Fig. 6 is a detail of the connection between the throttle and main levers.

Figure 1:
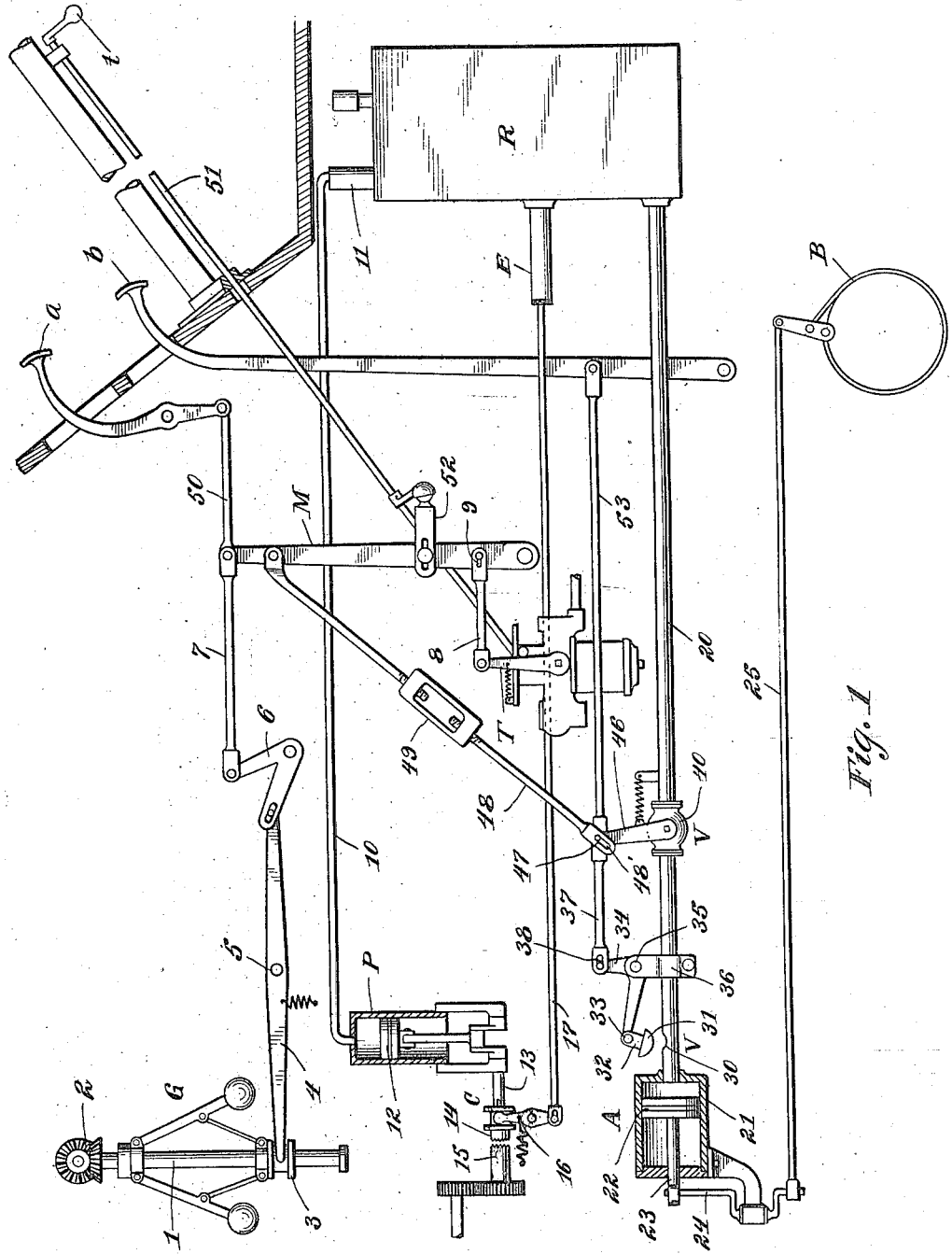
Figure 1 is a diagrammatic view of the entire invention, being in elevation with parts in section.

Broadly speaking, this invention comprises three main elements which are separately described below, viz: mechanism for automatically controlling the speed of the engine by a centrifugal governor, mechanism connected with the same governor for automatically applying the brakes to retard the speed of the automobile, and connections with the several features of these mechanisms whereby they may be operated by the foot. I will say at starting that many of the details of these mechanisms which are shown collectively in diagram in Fig. 1 and individually in the remaining views, are of ordinary or well known construction and not minutely described herein because no claim is made to them individually. My invention consists in the general combination of the various details making up these three principal features. It is my purpose to provide means whereby, when the engine attains excessive speed the supply of gas to it will be automatically cut down by a centrifugal speed governor which of course can be set to act where desired, and therefore the driver can set it so as to keep within the legal speed limit if he wishes. It may be, however, that in descending a hill or before the throttle is actuated by the governor, his machine has attained a momentum which continues after the engine is throttled down, and therefore under such conditions my invention contemplates the application of the brakes so as to retard the progress of the machine, and in this way doubly safeguard him against exceeding the speed limits. Yet there may be occasions when he does not desire these mechanisms to act, and therefore I connect them with the foot levers so that he can cut them out or apply them as he wishes.

*The engine regulator.*—This mechanism comprises a centrifugal governor G, a main lever M connected therewith, and a throttle lever T which may be on the carbureter or on the gas supply pipe leading from the carbureter to the intake manifold of the engine. The governor G is of the ordinary type, mounted on an upright axis 1 and connected by gearing 2 with some rotating shaft of the engine, as the cam shaft, and when the speed of this shaft increases a sleeve 3 rises on the axis and swings a rock lever 4 on its pivot 5. The remote end of this rock lever is connected by a bell crank lever 6 with a link 7 which is pivoted to the upper end of a main lever M as shown in the diagrammatic view in Fig. 1. The main throttle lever T is connected with the main lever by a link 8 which is slotted as at 9 so as to permit some lost motion for a purpose yet to appear. It is hardly necessary to show the throttle lever, except perhaps diagrammatically, but it is clear that when the governor G attains an excessively high speed the lever 4 will rock on its pivot and the bell crank lever 6 will draw on the link to swing the main lever to the left, and, through the slotted link 8, this will turn the throttle lever and cut down the gas—eventually cutting it off entirely.

*Automatic brake mechanism.*—The brakes or brake bands B are applied by air-brake mechanism A controlled by valves V in an air supply pipe leading from a tank or reservoir R, and pressure in the latter is maintained by means of a pump P connected by a clutch C with some moving part of the engine, the clutch being opened to stop the movements of the pump by a safety or escape valve E in the tank. Said air valves are controlled by the movements of the main lever M described above. While I have shown the reservoir R as automatically supplied with air by a pump which is driven by the engine, it is clear that this reservoir could contain compressed air which was replenished from other sources from time to time, or, in fact, the brakes could be applied by fluid pressure from any suitable source. In the construction illustrated, a pipe 10 leads from the pump to the tank through a suitable check valve 11, and the pump as here shown is of the reciprocating type, its piston 12 being connected with the crank on a shaft 13 whereon is splined a clutch element 14 engaging with another clutch element 15 which is geared to and constantly rotated by some moving shaft of the engine. The movable clutch element 14 is connected with a rock lever 16 from which a rod 17 leads to the spring-pressed piston 18 of a safety or escape valve E mounted on the tank R. When the pressure in the latter reaches an excessive height, it moves said piston 18 and flows out the opening 19, and the movement of the piston rocks the lever 16 and slides the clutch element 14 so as to disengage it from the clutch 15, thus stopping the motion of the pump and checking the feed of air to the tank.

From the tank R an air line or pipe 20 leads through the valves V to the air-brake mechanism A. The latter is herein shown as consisting of a cylinder 21 containing a piston 22 whose stem 23 is connected with a double crank shaft 24, and the other crank of said shaft is connected by a rod 25 with the brake beam which carries the brake bands B, or with a forked or branched rod whose arms are led to said bands in a usual manner. Therefore when air is allowed to flow through the line 20, the piston 22 moves within the cylinder and the rod 25 draws on and applies the brakes.

The valves V are of rather peculiar construction, best illustrated in Figs. 2 and 3. In the air line 20 near the cylinder 21 is formed a hole 30, and overlying the same is a flap valve or pad 31, shown as carried by a plate which is curved to conform to the curvature of the pipe 20. From said plate rise ears 32, to which at 33 is pivoted one arm of a bell crank lever 34, its angle being pivotally mounted at 35 on a clip 36 which embraces the pipe 20. To the other arm of said bell crank lever is pivotally connected a rod 37, the rod being slotted at 38 at its point of connection as seen in Fig. 2, and the purpose of this slot will yet appear. When this rod is drawn on to swing the bell crank lever on its pivot 35, it will be obvious that the pad 31 will be raised off the hole 30 and air within the pipe 20 will escape. At the same time the other valve will be closed, as described in the following paragraph, but the escape of air from the pipe 20 will let it out of the cylinder 21 and permit the piston to move to a position to release the brakes as will be clearly understood.

The valve above described is obviously for the escape of air, and in order that air within the tank or reservoir R may not flow to waste when said valve is opened, I make use of another valve best seen in Fig. 3 and which I will call the control valve. The casing 40 of this valve is let into the air line 20 at a point preferably back of the escape valve as seen in Fig. 1, and the valve plate is intended to turn from its closed position shown in full lines in Fig. 3 to its open position shown in dotted lines therein. The plate 41 has a hub 42 through which passes a shaft 43 which is cut away on one side as seen at 44, and a pin or set screw 45 through the hub bears against the flat face where this shaft is cut away. The set screw is so located as to permit a certain lost motion between the shaft and hub, for a purpose yet to appear. On one exterior end of said shaft is mounted a crank 46 pivotally connected at 47 to a link 48 whose other end is pivoted to the main lever M, and within the length of this link is preferably disposed a turn buckle 49 for lengthening and shortening the link as may be desired. The rod 37 leading from the bell crank lever 34 of the escape valve is pivotally connected with the crank 46, preferably at the same point 47 at which the link 48 is pivoted thereto, also for a purpose yet to appear.

*Manual control mechanism.*—The mechanisms above described are useful for automatically controlling the speed of the engine and the machine without attention on the part of the driver, but their function is to reduce the speed rather than increase it. In order that he may interrupt the automatic action of these mechanisms or that he may apply the brakes at will by permitting air to flow from the reservoir R to the air-brake mechanism A, I make use of the following devices: The letter *a* indicates the accelerator pedal, illustrated in Fig. 1 in diagram only, and this pedal is connected by a rod 50 with the main lever M. When the driver pushes on the pedal and draws on the rod 50, it is obvious that he will hold this lever to the right, against its movement to the left under the impulse of the governor G. The letter *t* indicates diagrammatically the throttle lever, usually adjacent the steering wheel of an automobile. 51 is a rod or connection leading from this lever to a link 52 which is attached to the main lever and preferably slotted as shown. The slot permits the ordinary actions of said main lever under the impulse of the governor G as above described, but should the driver push the throttle lever to its extreme, the connections 51 and 52 will hold said main lever to the right against the action of the governor G.

The letter $b$ designates a pedal for the brakes, a rod 53 leading from this pedal to the valves, and preferably attached to the crank 46 on the control valve at the same point 47 to which the link 48 and rod 37 are pivoted. When the operator presses on the brake pedal $b$, he pushes on the rod 53 and actuates the valves the same as they would be actuated by the movement of the main lever M to the left under the impulse of the governor G; therefore he may apply the brakes in advance of this application by the automatic mechanism. Some or all of these manual connections may be employed, and if they are used they may take the place of the ordinary connections between the several levers and the parts to be actuated thereby.

In the operation of this invention when it is properly connected up with the automobile, excessive speed of the engine increases the speed of the governor through the gearing connection 2, and the governor swings the main lever M to the left. According as the slot 9 is adjusted to connect the link 8 with said lever, when the latter has moved to a certain degree the throttle T is thrown against the action of its spring, and the flow of gas is first shut down and subsequently shut off entirely. This of course causes the engine to run slower and slower by reason of its own motive power, but the momentum of the machine may yet to an extent keep up the speed of the engine, especially if the machine should have been going quite rapidly or is now descending a hill. The movement of the main lever M pushes on the link 48, and when the inner end of the slot 48′ in the lower end thereof comes up against the pivot pin 47, the link swings the crank 46 and simultaneously the rod 37 swings the bell crank lever 34. The slot 38 in the extremity of the rod 37 is for adjustment purposes, because it is obvious that the two valves V must act simultaneously and oppositely. According as the set screw 45 is set on the flat face 44 of the shaft 43, the turning of the crank 46 will swing the plate 41 within the control valve. Therefore when the link 48 finally moves the crank 46, the latter closes the escape valve and opens the control valve. The pad 31 of the escape valve drops over the hole 30 so as to prevent the escape of air from the pipe 20, and the plate 41 turns within its casing 40 to allow air to pass through the pipe into the cylinder 21. When the piston in the latter is moved, the brakes B are applied in a manner which will be clear. Irrespective of the automatic application of the brakes, the slot 48′ in the lower end of the link allows their manual application by pressure on the brake pedal $b$, because an impulse on the rod 53 which moves the pivot point 47 to the left, will cause said pivot to move downward in the slot 48′ without drawing on the link 48 and swinging the main lever as above described. The spring behind the crank 46 restores it to its normal position which is closed as seen in Fig. 3, and the rod 37 simultaneously opens the escape valve to permit the escape of air within the cylinder 21 so that the brakes are automatically released. As the speed of the governor slows down, the parts are restored to their normal position. If it should so happen that the operator does not desire the governor to act automatically, he has but to place his foot on the accelerator pedal $a$ and through the rod 50 this holds the main lever M against movement to the left, and the connection of the main lever with the governor holds the governor against action under centrifugal force. Also by throwing the throttle lever $t$ to its extreme and drawing on the rod 51, the operator may put the link 52 under tension with the same result, and this link is slotted purposely so that the operator can not by any accidental movement of the throttle lever throw the automatic mechanism out of action.

What is claimed as new is:—

1. In a speed regulator for automobiles, the combination with a main lever, connections between it and the throttle, a centrifugal governor, and connections between it and said lever; of the brakes, air-brake mechanism for controlling them including a cylinder and piston, an air line leading to the cylinder from a source of compressed air supply, escape and control air valves in said air line and connected to operate oppositely in unison, and connections between said valves and the main lever, for the purpose set forth.

2. In a speed regulator for automobiles, the combination with a main lever, a centrifugal governor connected to the lever for moving it under excessive speed of the engine, and means whereby movement of said lever reduces the engine's speed; of brakes, air-brake mechanism for controlling them including a cylinder and piston, an air line leading to the cylinder from a source of compressed air supply, escape and control air valves in said air line and connected to operate oppositely in unison, and connections between said valves and the main lever, for the purpose set forth.

3. In a speed regulator for automobiles, the combination with a source of compressed air supply, a cylinder, a piston therein connected with the mechanism which it is desired to control, and an air line between said source and cylinder and having a hole adjacent the latter; of means for closing said hole, a control valve within said air line between said hole and the source of air supply, connections between the valve stem and the means for closing the hole whereby the latter is closed when the valve is opened, and vice versa, and means for moving said connections, for the purpose set forth.

4. In a speed regulator for automobiles, the combination with a source of compressed air supply, a cylinder, a piston therein connected with the mechanism which it is desired to control, and an air line between said source and cylinder and having a hole adjacent the latter; of a pad overlying said hole, a bell crank lever pivoted at its angle and having one arm connected with said pad, a control valve in the air line between said hole and the source of air supply, a crank on the shaft of said valve, a link connecting the crank with the other arm of said bell crank lever, and means for moving said links to close the pad and open the valve, and vice versa, for the purpose set forth.

5. In a speed regulator for automobiles, the combination with a source of compressed air supply, a cylinder, a piston therein connected with the mechanism which it is desired to control, and an air line between said source and cylinder and having a hole adjacent the latter; of a pad overlying said hole, a bell crank lever pivoted at its angle and having one arm connected with said pad, a control valve in the air line between said hole and the source of air supply, a crank on the shaft of said valve, a link connecting said crank with the other arm of said bell crank lever, a second link having a slotted extremity movably mounted on the pivot between the first link and the crank, means for moving the second link when the automobile attains excessive speed, and independent means for moving said pivotal point at the will of the driver.

6. In a speed regulator for automobiles, the combination with air brake mechanism including a cylinder and a piston, connections between the latter and the brake bands, a source of compressed air supply, and an air line leading from the source of the cylinder and having an escape opening adjacent the latter; of a valve for closing said opening, and a control valve within the air line between said opening and source, levers for actuating said valves simultaneously and oppositely, a link pivotally connecting the lever, a rod connecting the pivotal point of the link with the crank on the control valve and leading thence to a source of manual power, and another link having a slotted extremity mounted on said pivot with its opposite end leading to a source of automatic energy, for the purpose set forth.

In testimony whereof I affix my signature.

IRWIN E. HENRY.